United States Patent [19]

Bentz

[11] Patent Number: 4,787,670

[45] Date of Patent: Nov. 29, 1988

[54] FLOOR SUBFRAME FOR CARGO TRUCK SLEEPER CAB

[75] Inventor: Richard A. Bentz, Fort Wayne, Ind.

[73] Assignee: Bentz Metal Products Co., Inc., Fort Wayne, Ind.

[21] Appl. No.: 95,830

[22] Filed: Sep. 11, 1987

[51] Int. Cl.$^4$ .............................................. B62D 33/06
[52] U.S. Cl. ...................................... 296/190; 5/118; 5/119; 296/181
[58] Field of Search ...................... 296/190, 181, 24 R, 296/183, 204, 29; 5/118, 119; 52/143, 79.6, 79.9, 79.12

[56] References Cited

U.S. PATENT DOCUMENTS

| 4,121,684 | 10/1978 | Stephens et al. | 296/190 X |
| 4,145,080 | 3/1979 | Miller et al. | 296/183 |
| 4,201,415 | 5/1980 | Suchanek | 296/190 |
| 4,249,295 | 2/1981 | Lance | 296/24 R X |

Primary Examiner—Robert R. Song
Assistant Examiner—John Gruber
Attorney, Agent, or Firm—Pearne, Gordon, McCoy & Granger

[57] ABSTRACT

A floor subframe construction for a sleeper cab of the type used in a tractor/trailer rig and adapted to be located behind the driver's cab and supported on the tractor frame. The sleeper cab has vertical exterior wall sections and a floor panel formed of metal sheet. The floor panel is supported on an exterior metal floor subframe that includes parallel front and rear main beams, a plurality of interior cross members extending perpendicular to and between the main beams, and exterior side members connected between the outer ends of the main beams. The main beams, cross members, and side members define coplanar supporting surfaces for the floor panel. Each of the beams has upper and lower horizontal flanges spaced apart and joined by a vertical web at the outer ends thereof to define an inwardly facing open channel. The lower flange has a top surface on which the cross members are supported and secured, and has openings formed therein to receive the mounting bolts for securing the sleeper cab to the tractor frame. The ends of the bolts are located in the open channel. The top face of the upper flange has a vertical rib extending upwardly and having an outer surface to which the lower ends of the respective wall sections are welded.

1 Claim, 3 Drawing Sheets

FLOOR SUBFRAME FOR CARGO TRUCK SLEEPER CAB

BACKGROUND OF THE INVENTION

This invention relates to large cargo-type automotive vehicles, such as tractor/trailer rigs, and especially to the cab and sleeper compartment structure for such rigs wherein, in addition to the driver's cab, there is a separate compartment or "sleeper cab" located behind the driver's cab and separately mounted on the tractor frame.

More particularly, the invention relates to the construction of a sheet metal sleeper cab with a special floor subframe design that serves as a support for an interior floor panel and as a means for mounting the sleeper cab to the tractor frame.

In modern tractor/trailer rigs such as are used for hauling cargo long distances, the tractor for the rig is often provided with a separate sleeper cab located behind the driver's cab and used by the driver for resting and sleeping while stopped along the road. The sleeper cabs are usually fabricated of sheet metal and are fully enclosed to provide protection from the weather. Often, they have separate heating and air conditioning systems. The primary purpose is to provide the driver with a sleeping facility at any time day or night.

The floor of the sleeper cab (usually a single sheet metal panel) is supported on a floor subframe that is, in turn, mounted by brackets or the like to the tractor frame. Usually, the tractor frame includes a pair of parallel box beams connected by cross bracing. Upright brackets are welded or bolted to the box beams to provide the mounting means for the floor subframe of the sleeper cab.

Conventionally, the floor subframe consists of a pair of parallel main beams, such as "I-beams" or box beams and cross members located on top of and extending between the main beams. The floor panel is supported on the cross members and the sheet metal side walls are connected, for example, to brackets mounted on the edges of the floor panel.

This is often not an attractive design, since the subframe is visible below the side walls. Also, this arrangement requires substantial vertical space for the frame so that the sleeper cab extends higher than would otherwise be necessary.

The floor subframe construction of the present invention resolves many problems inherent in prior art designs, and affords other features and advantages heretofore not obtainable.

SUMMARY OF THE INVENTION

It is among the objects of the present invention to provide a sleeper cab floor subframe that requires a minimum amount of vertical space, provides a convenient means for mounting to the tractor frame, provides a convenient support for the floor panel, and also provides a means for welding the sheet metal walls to the subframe in a way that harmonizes with the overall appearance of the sleeper cab.

Another object of the present invention is to provide a sleeper cab of simplified construction that in particular facilitates the connection of the sleeper cab side walls and side frame members to the floor subframe.

These and other objects and advantages are achieved with the unique sleeper cab floor subframe construction of the invention. The sleeper cab has vertical exterior wall sections and a floor panel, all formed of sheet metal such as an aluminum alloy. The floor panel is supported on an exterior metal floor subframe attached to a tractor frame by brackets or the like to bolts positioned vertically.

In accordance with the invention, the subframe includes parallel front and rear main beams having a unique cross section, a plurality of interior cross members extending perpendicularly to and between the main beams, and exterior side members connected between the outer ends of the main beams. The side members, cross members, and main beams define coplanar supporting surfaces for the floor panel.

Each of the main beams includes upper and lower horizontal flanges spaced apart vertically from one another and joined by a vertical web at the outer ends of the flanges to define with the flanges an inwardly facing channel. The lower flange has a top surface on which the cross members are supported and secured, such as by welding, and also has openings formed therein to receive the bolts for securing the sleeper cab to the tractor frame. The ends of the bolts extend into the channel and are located therein. The upper flange has a top surface, part of which serves as a support for the floor panel. The upper flange also has a vertical rib extending upwardly and having an outer surface to which the lower ends of the respective wall sections are welded.

Preferably, the outer surface of the vertical rib is offset from the plane of the exterior surface of the vertical web so that the exterior surface of the vertical web is coplanar with the respective exterior wall section. Also in the preferred embodiment, the top surface portion of the upper flange is offset below the adjacent upper surface so that the adjacent upper surface is coplanar with the floor panel.

DESCRIPTION OF THE PREFERRED EMBODIMENT

Figure 1:
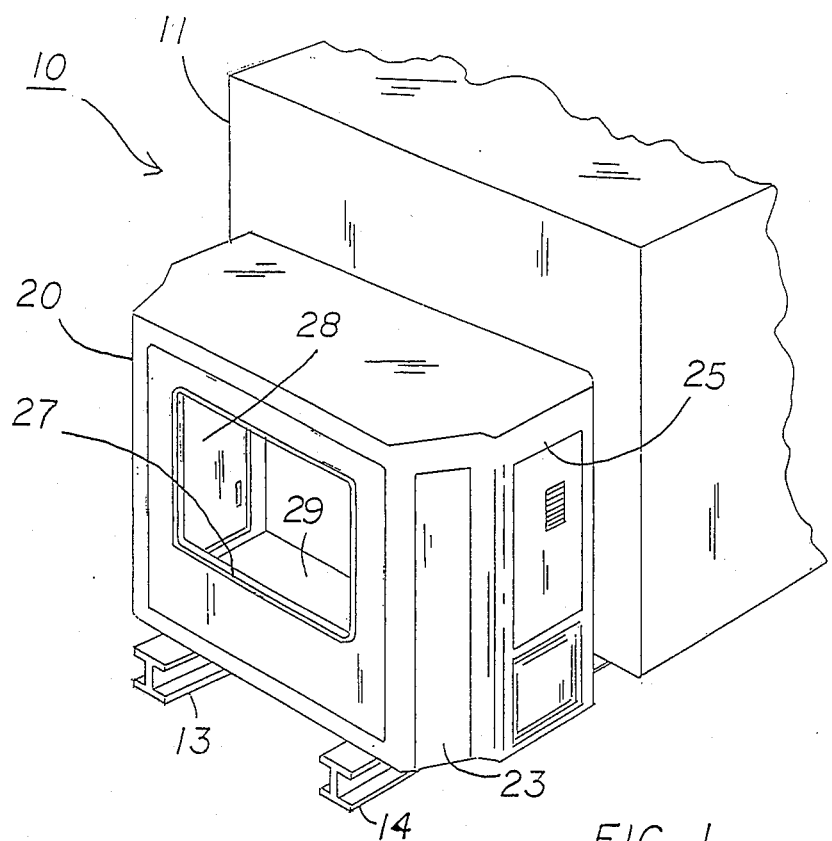
FIG. 1 is a fragmentary, perspective view of a tractor/trailer rig illustrating a sleeper cab having a floor subframe embodying the invention.
Figure 2:
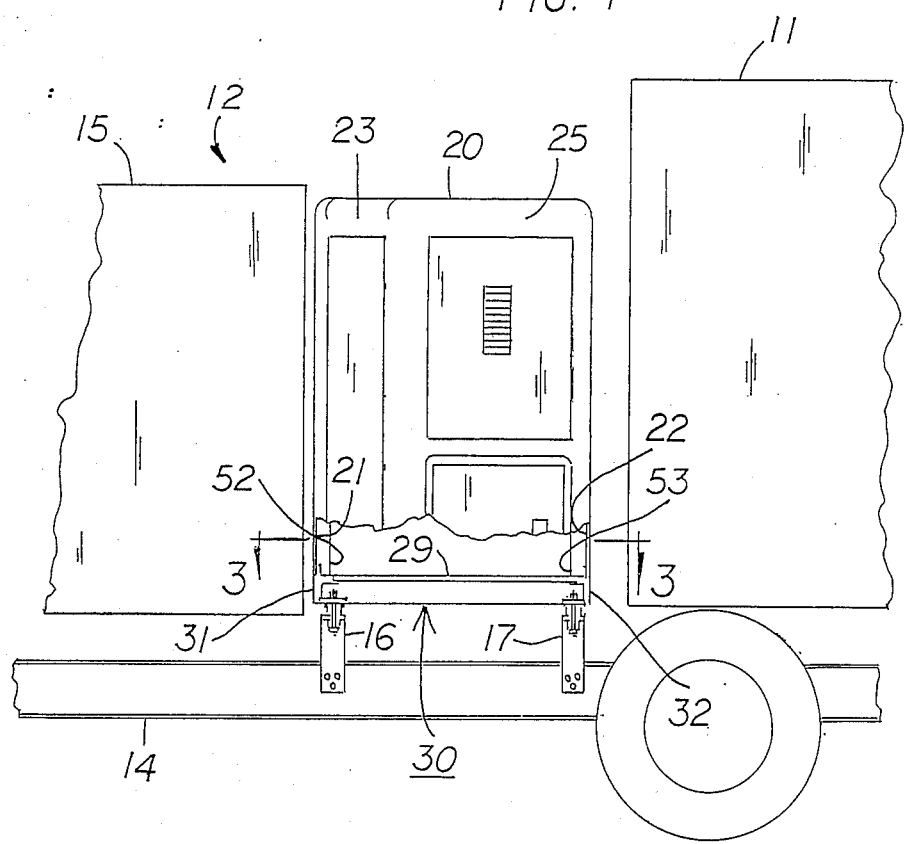
FIG. 2 is a fragmentary, elevational view, with parts broken away and shown in section, illustrating the sleeper cab of FIG. 1 and the floor subframe embodying the invention.
Figure 3:
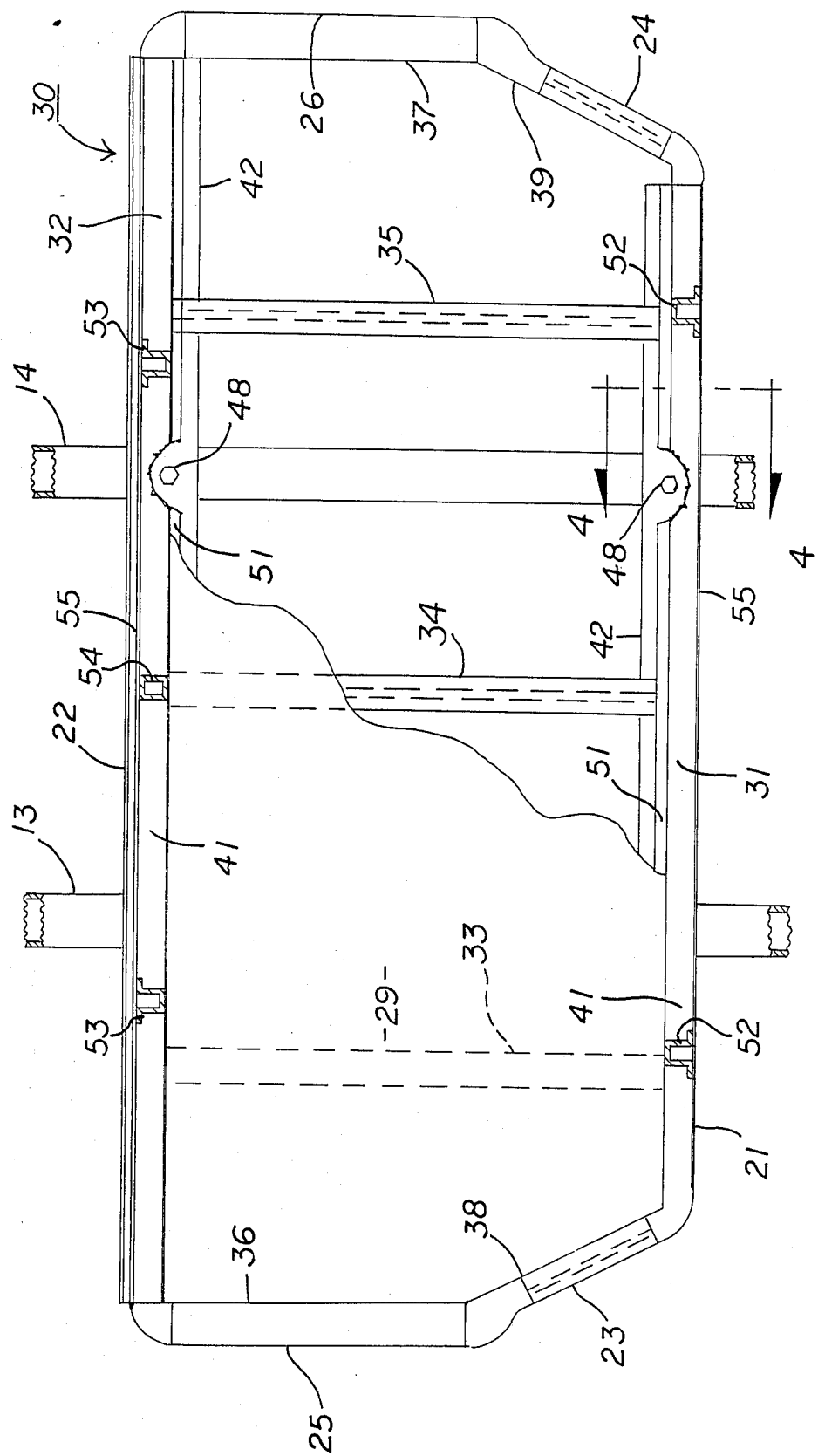
FIG. 3 is a horizontal section taken on the line 3—3 of FIG. 2, with parts broken away and shown in section for the purpose of illustration.
Figure 4:
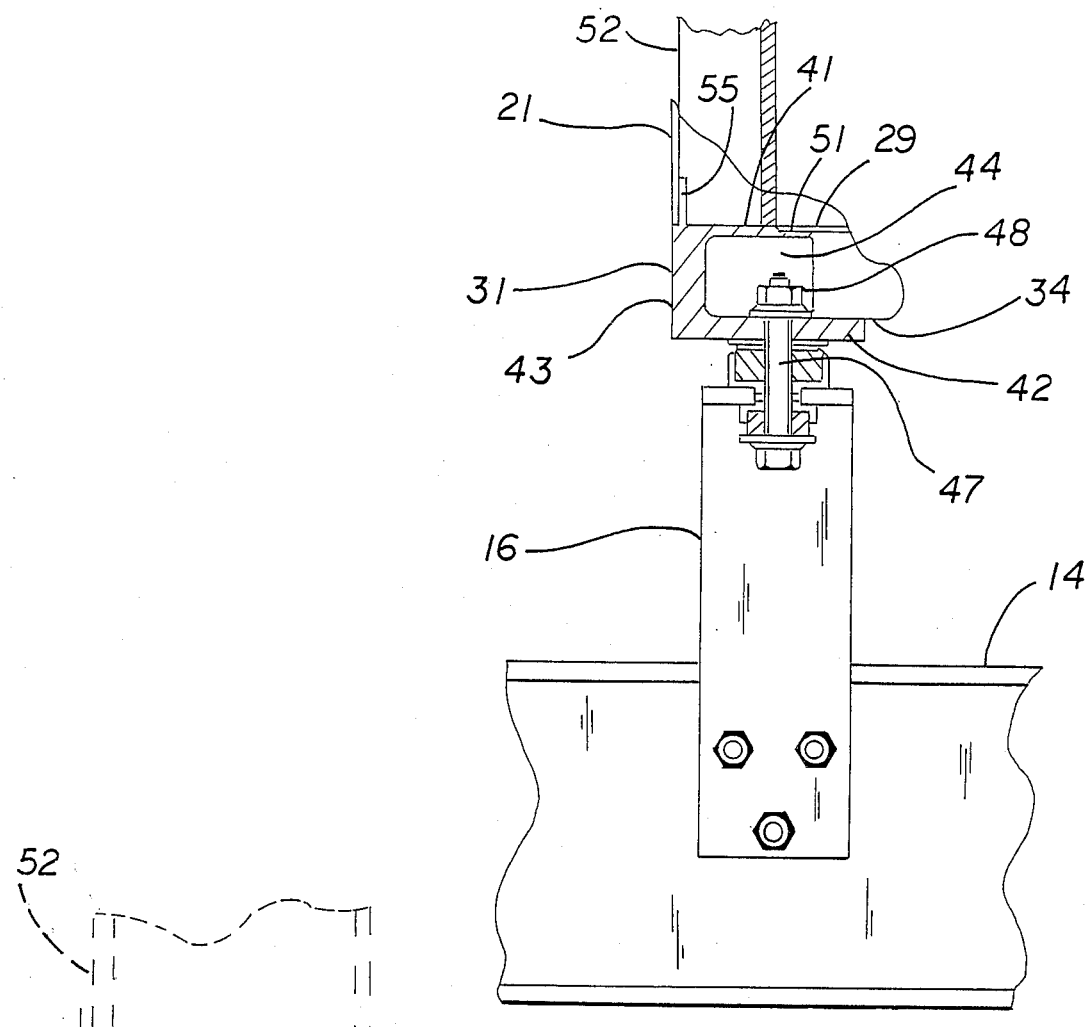
FIG. 4 is a fragmentary, sectional view on an enlarged scale, taken on the line 4—4 of FIG. 3.
Figure 5:
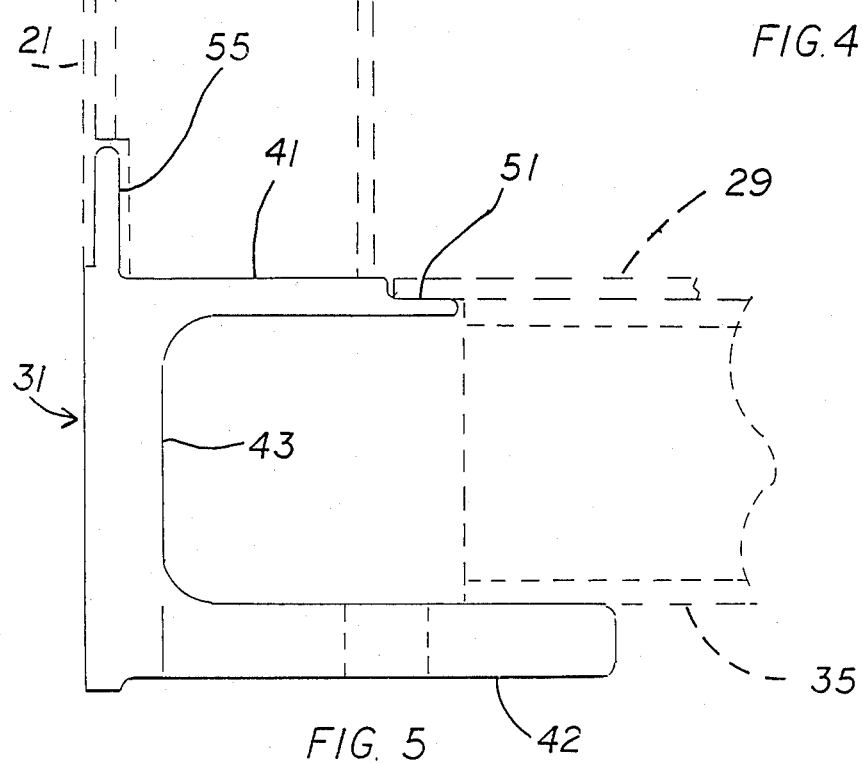
FIG. 5 is an end elevation on an enlarged scale of one of the main beams used in the floor subframe of the invention.

Referring more particularly to the drawings, and initially to FIGS. 1 and 2, there is shown a tractor/trailer rig 10 including a cargo trailer 11, and a tractor 12 that includes parallel longitudinal frame members or beams 13 and 14, a driver's cab 15 mounted thereon and a sleeper cab 20 mounted to the frame members 13 and 14 at the rear of the driver's cab 15.

As shown in FIG. 2, the sleeper cab 20 has a floor subframe 30 embodying the invention, mounted on upright front brackets 16 and rear brackets 17 that are bolted to the tractor frame members 13 and 14.

The sleeper cab 20 is formed of metal sheet such as aluminum alloy fabricatd to form an enclosure. The cab has a six-sided configuration, as best shown in FIG. 1, and includes front and rear panels 21 and 22, side wall front sections 23 and 24, and side wall main sections 25 and 26. The front wall 21 has a window or opening that permits access back and forth between the driver's cab and the sleeper cab. Also, the side wall main section 26 has an exterior door 28. A sheet metal floor panel 29 is supported on and welded to the floor subframe 30.

The subframe 30 includes a front main beam 31, a rear main beam 32, and three cross members 33, 34, and 35 extending perpendicular to and connecting together the front and rear beams 31 and 32. The front and rear beams 31 and 32 are formed of aluminum alloy extrusions, and have a cross section of a special design in accordance with the invention. The cross members 33, 34, and 35 are generally U-shaped channel members with outwardly extending flanges. This shape is frequently referred to as a "high hat" type configuration. The ends of the beams 31 and 32 are connected by main end members 36 and 37, and forward end members 38 and 39 to complete the frame assembly.

The front and rear beams 31 and 32 are, as indicated, extrusions that have a special cross-sectional configuration to achieve the advantages of the invention. Each beam 31, 32 includes upper and lower flanges 41 and 42 vertically spaced from one another and connected by a vertical web 43 that forms the exterior face of the floor subframe. The flanges 41 and 42 and web 43 define an inwardly facing channel 44. The upper surface of the lower flange 42 serves as a support for the outer ends of the cross members 33, 34, and 35, and also has circular openings that receive mounting bolts 47 used to connect the floor subframe 30 to the mounting brackets 16 and 17. The bolts are vertically positioned and extend upwardly through the brackets 16 and 17 and through the circular openings 45 into the channel 44. They are secured by nuts 48 that are located within the channel 44. The bottom face of the lower flange rests on a cushioned bushing 49 located between the respective beam and the bracket 16.

The top face of the upper flange 41 has a portion of its surface chamfered so as to be offset below the plane of the remaining portion of the top surface. The offset surface portion 51 is adapted to receive the edge portion of the floor panel 29 so that the top surface of the floor panel is coplanar with the remaining surface portion of the upper flange 41. Accordingly, the beams 31 and 32, cross members 33, 34, and 35, and portions of the end members 36, 37, 38, and 39 define coplanar surface portions that are adapted to receive and support the floor panel 29.

The upper flange 41 also has an upwardly extending rib 55 that is located toward the exterior end of the flange, and which has an outer surface that is offset from the outer surface of the web 43. The offset is equal to the thickness of the sheet metal side walls so that when the side wall 23 is welded to the outer face of the rib 55, it is coplanar with the outer face of the web 43.

The front and rear wall panels 21 and 22 are also welded to front and rear vertical frame members 52, 53, the bottoms of which are welded to the top face of the upper flanges 41.

From the foregoing description, it will be apparent that the beams 31 and 32 have the unique capability of serving several different functions to achieve an advantageous simplification of construction and assembly. They serve as supports and anchors for cross members 33, 34, and 35 as part of the connecting means for anchoring the subframe to the tractor frame, as supports for the floor panels 29, and as the means for securing the lower ends of the side walls and vertical frame members 52, 53 to the floor subframe. This unique combination of functions is provided in one single extruded beam member that achieves substantial improvements in appearance and ease of construction.

While the present invention has been shown and described with respect to a specific embodiment thereof, this is intended for the purpose of illustration rather than limitation, and other modifications and variations of the specific form herein shown and described will be apparent to those skilled in the art all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. In a sleeper cab for a tractor/trailer rig adapted to be located behind the driver's cab and to be supported on the tractor frame, the sleeper cab having vertical exterior wall sections and a floor panel formed of metal sheet, the floor panel being supported on an exterior metal floor subframe attached to a tractor frame mounting means by vertically positioned bolts, the improvement wherein said floor subframe comprises:

parallel front and rear main beams;

a plurality of interior cross members extending perpendicular to and between the main beams; and exterior side members connected between the outer ends of the beams, and defining with the beams and the cross members coplanar supporting surfaces for the floor panel;

each of the beams having:

upper and lower horizontal flanges spaced apart and joined by a vertical web at the outer ends of the flanges to define with the flanges an inwardly facing open channel, the lower flange having a top surface on which the cross members are supported and secured and having openings formed therein to receive the bolts for securing the sleeper cab to the tractor frame, the ends of the bolts being located in the channel, and a vertical rib extending upwardly from the top surface of the upper flange and having an outer surface to which the lower ends of the respective wall sections are welded.

* * * * *